(12) United States Patent
Ough (10) Patent No.: US 12,261,417 B2
(45) Date of Patent: Mar. 25, 2025

(54) COMMON BUS SWITCHGEAR FOR MOBILE HYBRID MICROGRIDS

(71) Applicant: VOLTAGRID LLC, Bellaire, TX (US)

(72) Inventor: Nathan Ough, Bellaire, TX (US)

(73) Assignee: VOLTAGRID LLC, Bellaire, TX (US)

( * ) Notice: Subject to any disclaimer, the term of this patent is extended or adjusted under 35 U.S.C. 154(b) by 0 days.

(21) Appl. No.: 17/385,441

(22) Filed: Jul. 26, 2021

(65) Prior Publication Data

US 2022/0029391 A1 Jan. 27, 2022

Related U.S. Application Data

(60) Provisional application No. 63/056,362, filed on Jul. 24, 2020.

(51) Int. Cl.
| | |
|---|---|
| *H02B 1/20* | (2006.01) |
| *E21B 43/26* | (2006.01) |
| *H02B 1/04* | (2006.01) |
| *H02B 1/52* | (2006.01) |
| *H02B 7/06* | (2006.01) |

(52) U.S. Cl.
CPC ............... *H02B 1/04* (2013.01); *H02B 1/20* (2013.01); *H02B 1/52* (2013.01); *H02B 7/06* (2013.01); *E21B 43/2607* (2020.05)

(58) Field of Classification Search
CPC ... H02B 1/04; H02B 1/20; H02B 1/52; H02B 7/06; E21B 43/2607
See application file for complete search history.

(56) References Cited

U.S. PATENT DOCUMENTS

| 3,144,585 | A | * | 8/1964 | Blakemore | ............ | H02H 7/262 |
| | | | | | | 361/66 |
| 3,773,152 | A | | 11/1973 | Sitton | | |
| 4,894,764 | A | | 1/1990 | Meyer et al. | | |
| 5,315,831 | A | | 5/1994 | Goode et al. | | |
| 6,194,794 | B1 | * | 2/2001 | Lampe | ...................... | H02J 3/38 |
| | | | | | | 307/68 |
| 7,795,752 | B2 | | 9/2010 | Gorman et al. | | |
| 8,013,470 | B2 | | 9/2011 | Votoupal et al. | | |
| 8,062,169 | B2 | | 11/2011 | Marr et al. | | |
| 8,258,640 | B2 | | 9/2012 | Conway et al. | | |
| 8,360,180 | B2 | | 1/2013 | Hoff et al. | | |
| 8,427,005 | B1 | * | 4/2013 | Kisner | ...................... | H02J 9/08 |
| | | | | | | 307/18 |

(Continued)

FOREIGN PATENT DOCUMENTS

| AU | 2022263514 | 6/2023 |
| CA | 3078879 | 4/2019 |

(Continued)

OTHER PUBLICATIONS

US 10,774,631 B2, 09/2020, Oehring et al. (withdrawn)

*Primary Examiner* — Robert J Hoffberg
(74) *Attorney, Agent, or Firm* — Morgan, Lewis & Bockius LLP (57) ABSTRACT

A microgrid system comprising a switchgear trailer comprising a plurality of breakers configured to support generators; at least one breaker configured to support a utility source; at least one breaker configured to output power; wherein the breakers are in a parallel arrangement; a plurality of interchangeable connectors; and a common bus.

7 Claims, 6 Drawing Sheets

(56) References Cited

U.S. PATENT DOCUMENTS

| | | | |
|---|---|---|---|
| 8,427,814 B1* | 4/2013 | Gonce | H02B 1/52 361/600 |
| 8,547,668 B2* | 10/2013 | Dahlen | H02J 3/40 361/20 |
| 8,587,136 B2 | 11/2013 | Williams | |
| 8,884,467 B2* | 11/2014 | Lundqvist | H02H 3/30 307/97 |
| 8,975,767 B2 | 3/2015 | Algrain | |
| 9,103,193 B2 | 8/2015 | Coli | |
| 9,140,110 B2 | 9/2015 | Coli et al. | |
| 9,175,614 B2 | 11/2015 | Hoefer et al. | |
| 9,413,164 B2* | 8/2016 | Hoeven | B63H 25/42 |
| 9,552,029 B2* | 1/2017 | Vaum | G06F 1/28 |
| 9,562,420 B2 | 2/2017 | Morris et al. | |
| 9,660,455 B2 | 5/2017 | Votoupal et al. | |
| 9,722,445 B2 | 8/2017 | Yu et al. | |
| 9,893,500 B2 | 2/2018 | Oehring et al. | |
| 9,970,278 B2 | 5/2018 | Broussard et al. | |
| 9,995,218 B2 | 6/2018 | Oehring et al. | |
| 10,020,711 B2 | 7/2018 | Oehring | |
| 10,146,242 B2 | 12/2018 | Steffen et al. | |
| 10,240,322 B2 | 3/2019 | Miller et al. | |
| 10,280,724 B2 | 5/2019 | Hinderliter | |
| 10,374,485 B2 | 8/2019 | Morris et al. | |
| 10,389,121 B1 | 8/2019 | Sherry | |
| 10,519,730 B2 | 12/2019 | Morris et al. | |
| 10,526,882 B2 | 1/2020 | Oehring et al. | |
| 10,598,258 B2 | 3/2020 | Oehring et al. | |
| 10,686,301 B2 | 6/2020 | Oehring et al. | |
| 10,837,270 B2 | 11/2020 | Coli et al. | |
| 10,851,638 B2 | 12/2020 | Payne et al. | |
| 10,927,802 B2 | 2/2021 | Oehring et al. | |
| 10,935,945 B2* | 3/2021 | Morton | H02J 3/46 |
| 10,962,305 B2 | 3/2021 | Morris et al. | |
| 10,998,732 B2 | 5/2021 | Reddy et al. | |
| 11,035,207 B2 | 6/2021 | Oehring et al. | |
| 11,070,109 B2 | 7/2021 | Morris et al. | |
| 11,181,107 B2 | 11/2021 | Oehring et al. | |
| 11,208,878 B2* | 12/2021 | Oehring | F02B 63/06 |
| 11,211,801 B2* | 12/2021 | Hinderliter | E21B 43/2607 |
| 11,359,462 B2* | 6/2022 | Morris | E21B 43/26 |
| 11,391,269 B2 | 7/2022 | Tanner | |
| 11,394,231 B2* | 7/2022 | Moorman | H02J 7/34 |
| 11,434,763 B2 | 9/2022 | Morrisw et al. | |
| 11,451,016 B2* | 9/2022 | Oehring | F02C 3/22 |
| 11,451,085 B2 | 9/2022 | Reddy et al. | |
| 11,476,781 B2 | 10/2022 | Oehring et al. | |
| 11,578,577 B2* | 2/2023 | Hinderliter | H02B 1/24 |
| 11,578,580 B2 | 2/2023 | Oehring et al. | |
| 11,946,353 B2 | 4/2024 | Bosco et al. | |
| 2004/0265198 A1 | 12/2004 | Biswas et al. | |
| 2005/0225090 A1* | 10/2005 | Wobben | H02J 3/1885 290/44 |
| 2010/0283244 A1 | 11/2010 | Howson et al. | |
| 2012/0182670 A1 | 7/2012 | Prax et al. | |
| 2013/0002027 A1 | 1/2013 | Yu et al. | |
| 2016/0348479 A1 | 12/2016 | Oehring et al. | |
| 2017/0145918 A1 | 5/2017 | Oehring et al. | |
| 2017/0201077 A1 | 7/2017 | Hafner et al. | |
| 2017/0237274 A1 | 8/2017 | Pavel et al. | |
| 2018/0123357 A1 | 5/2018 | Beaston et al. | |
| 2019/0106970 A1 | 4/2019 | Oehring | |
| 2019/0323428 A1 | 10/2019 | Oehring et al. | |
| 2020/0040705 A1 | 2/2020 | Morris et al. | |
| 2020/0087997 A1 | 3/2020 | Morris et al. | |
| 2020/0095854 A1 | 3/2020 | Hinderliter | |
| 2020/0109617 A1* | 4/2020 | Oehring | E21B 43/2607 |
| 2020/0243813 A1 | 7/2020 | Zhang et al. | |
| 2020/0251910 A1 | 8/2020 | Moorman | |
| 2020/0300073 A1 | 9/2020 | Hinderliter et al. | |
| 2020/0340340 A1 | 10/2020 | Oehring et al. | |
| 2020/0355058 A1 | 11/2020 | Payne et al. | |
| 2020/0355120 A1 | 11/2020 | Oehring et al. | |
| 2020/0386169 A1 | 12/2020 | Hinderliter et al. | |
| 2021/0025382 A1 | 1/2021 | Harvell et al. | |
| 2021/0032961 A1 | 2/2021 | Hinderliter et al. | |
| 2021/0075222 A1 | 3/2021 | Wilson et al. | |
| 2021/0095552 A1 | 4/2021 | Oehring et al. | |
| 2021/0102531 A1 | 4/2021 | Bodishbaugh et al. | |
| 2021/0131248 A1 | 5/2021 | Hinderliter et al. | |
| 2021/0159677 A1 | 5/2021 | Oehring et al. | |
| 2021/0230987 A1 | 7/2021 | Tanner | |
| 2021/0245607 A1 | 8/2021 | Zhang et al. | |
| 2021/0262321 A1 | 8/2021 | Oehring et al. | |
| 2021/0310341 A1 | 10/2021 | Sherman et al. | |
| 2021/0351660 A1 | 11/2021 | Morris et al. | |
| 2021/0351661 A1 | 11/2021 | Morris et al. | |
| 2021/0359521 A1 | 11/2021 | Gayles et al. | |
| 2022/0010758 A1 | 1/2022 | Oehring et al. | |
| 2022/0018232 A1 | 1/2022 | Oehring et al. | |
| 2022/0029425 A1* | 1/2022 | Ough | H02J 3/32 |
| 2022/0041153 A1 | 2/2022 | Sakaray et al. | |
| 2022/0045376 A1 | 2/2022 | Sakaray et al. | |
| 2022/0045380 A1 | 2/2022 | Sakaray et al. | |
| 2022/0069613 A1 | 3/2022 | Reddy et al. | |
| 2022/0085604 A1* | 3/2022 | Nirantare | H02J 3/001 |
| 2022/0094173 A1 | 3/2022 | Hinderliter et al. | |
| 2022/0131381 A1 | 4/2022 | Sergott et al. | |
| 2022/0131388 A1 | 4/2022 | Sergott et al. | |
| 2022/0140614 A1* | 5/2022 | Ough | H02J 3/381 307/84 |
| 2022/0200291 A1 | 6/2022 | Guo et al. | |
| 2022/0239100 A1 | 7/2022 | Hinderliter et al. | |
| 2022/0278531 A1* | 9/2022 | Ough | H02J 7/0063 |
| 2022/0364448 A1 | 11/2022 | Oehring et al. | |
| 2023/0109325 A1 | 4/2023 | Oehring et al. | |
| 2023/0155358 A1* | 5/2023 | Oehring | F04B 17/03 166/66.4 |
| 2023/0258063 A1 | 8/2023 | Oehring et al. | |
| 2023/0272699 A1 | 8/2023 | Oehring et al. | |
| 2023/0272700 A1 | 8/2023 | Hinderliter et al. | |
| 2023/0383635 A1 | 11/2023 | Bosco et al. | |

FOREIGN PATENT DOCUMENTS

| | | |
|---|---|---|
| CA | 2964593 | 11/2021 |
| CA | 3157053 | 5/2022 |
| CA | 3067854 | 6/2022 |
| CA | 2908276 | 11/2022 |
| EP | 2192664 | 5/2013 |
| EP | 3830387 | 2/2020 |
| GB | 2506015 | 3/2014 |
| WO | 2022182886 | 9/2022 |

\* cited by examiner

COMMON BUS SWITCHGEAR FOR MOBILE HYBRID MICROGRIDS

BACKGROUND OF THE INVENTION

This disclosure relates in general to microgrids, and in particular, to systems and methods of a transportable microgrid.

In particular, embodiments of the present disclosure include a transportable microgrid with a common bus switchgear and/or interchangeable breaker sections. Such arrangements allow for reliable and flexible power from the microgrid with the additional benefit of manipulating the energy utilized as the situation requires. The technology described herein can be used in many different applications, including, for example mining, utility power, oilfield applications, industrial application, and any application that requires a micro-grid, especially a temporary, mobile microgrid.

The present technology enables mobile hybrid microgrids to be rapidly deployed and rapidly moved. This is a great improvement over known switchgears, which are typically built as a building or on a skid, intended to be permanently installed.

DESCRIPTION OF PRIOR ART

A microgrid is a self-sufficient energy system that serves a discrete geographic footprint. A microgrid has control capability, which means it can disconnect from the traditional grid and operate autonomously. The microgrid is made up of a decentralized group of electricity sources and loads that normally operate connected to, and synchronous with, the traditional wide area synchronous grid (macrogrid). These electricity sources can also disconnect to "island mode," where the microgrid operates independently of the macrogrid, and function autonomously as physical or economic conditions dictate. In this way, a microgrid can effectively integrate various sources of distributed generation (DG), especially Renewable Energy Sources (RES), and can supply emergency power, changing between island and connected modes. Mircogrids are also capable of dispatching power to the macrogrid.

Microgrids are best served as localized energy sources, where power transmission and distribution from a major centralized energy source is impractical to implement and/or cost prohibitive.

However, microgrids often have a large geographical footprint such that it is difficult or costly to move them. This can be disadvantageous for operations that benefit from a microgrid, but only need one for a short period of time, such as in many oil and gas operations.

Further, existing microgrids can be unreliable, especially when reduced to a size that could be used in a mobile application. If a power source goes down, it can be costly and time-consuming to replace it with a new one and get back up and running. In oil and gas operations, any delay can cost an operator hundreds of thousands or even millions of dollars, so reliability is critically important.

BRIEF DESCRIPTION OF THE DRAWINGS

The present technology will be better understood on reading the following detailed description of non-limiting embodiments thereof, and on examining the accompanying drawings, in which.

DETAILED DESCRIPTION OF THE INVENTION

The foregoing aspects, features and advantages of the present technology will be further appreciated when considered with references to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

Various embodiments of the present disclosure utilize a mobile-hybrid microgrid system with a common bus switchgear designed to connect to a plurality of generators and other power sources. By way of example, the mobile-hybrid microgrid system may include connections to generator power sources, utility power sources, and/or energy storage power sources. In certain embodiments, the power sources are connected to a common bus. Embodiments may also include one or more feeder sections. In certain embodiments the connections on the trailer may be a fast coupler connection connected to a 13kVA extension. In some embodiments, this is a coupler such as a TJB connector made and sold by TJB, Inc., of North Ridgeville, Ohio. These connectors are widely used in the industry.

In various embodiments, the common bus switchgear is made up of a plurality of breakers serving a variety of purposes. For example, the common bus switchgear may be comprised of 9 generator breakers, 1 Energy Storage System breaker, 1 utility breaker, and 2 feeder breakers. Each breaker is positioned so that it may hook up to one of the connectors of the switchgear trailer. The breakers can all utilize fast coupler connections. As a result, the breakers may be positioned in a variety of configurations.

In various embodiments, the common bus switchgear is a high voltage bus with oversized ampacity for the system. Typically, the common bus is the bottleneck for the system as it limits the amount of power than can run through the system. In these embodiments, the common bus is designed to have a larger ampacity than is required by the system. This allows the system to operate at a high power density. The increased power density allows the system to operate more flexibly. For example, the increased power density allows the system to operate with all power sources on or selected power sources on. This in conjunction with an integrated control system enables the operator to manipulate the power sources in real time such that the system can be optimized for a variety of parameters including: cost, power source, emissions, revenue potential, and variation of source. Further, the system is able to interchange sources of energy in a dynamic manner for a variety of reasons including to: charge, discharge, dispatch, and provide power to load.

In certain embodiments, the integrated control system can activate additional generators based on desired response characteristics. For example, if the operator wants to increase stiffness of the system the operator can activate generators in addition to the minimum amount necessary for the output requirement.

In certain embodiments the switchgear trailer includes a custody transfer meter or a plurality thereof. The custody transfer meter allows the microgrid to legally sell, transport, and account for power. This also allows for common billing for those operating the microgrid.

Figure 1:
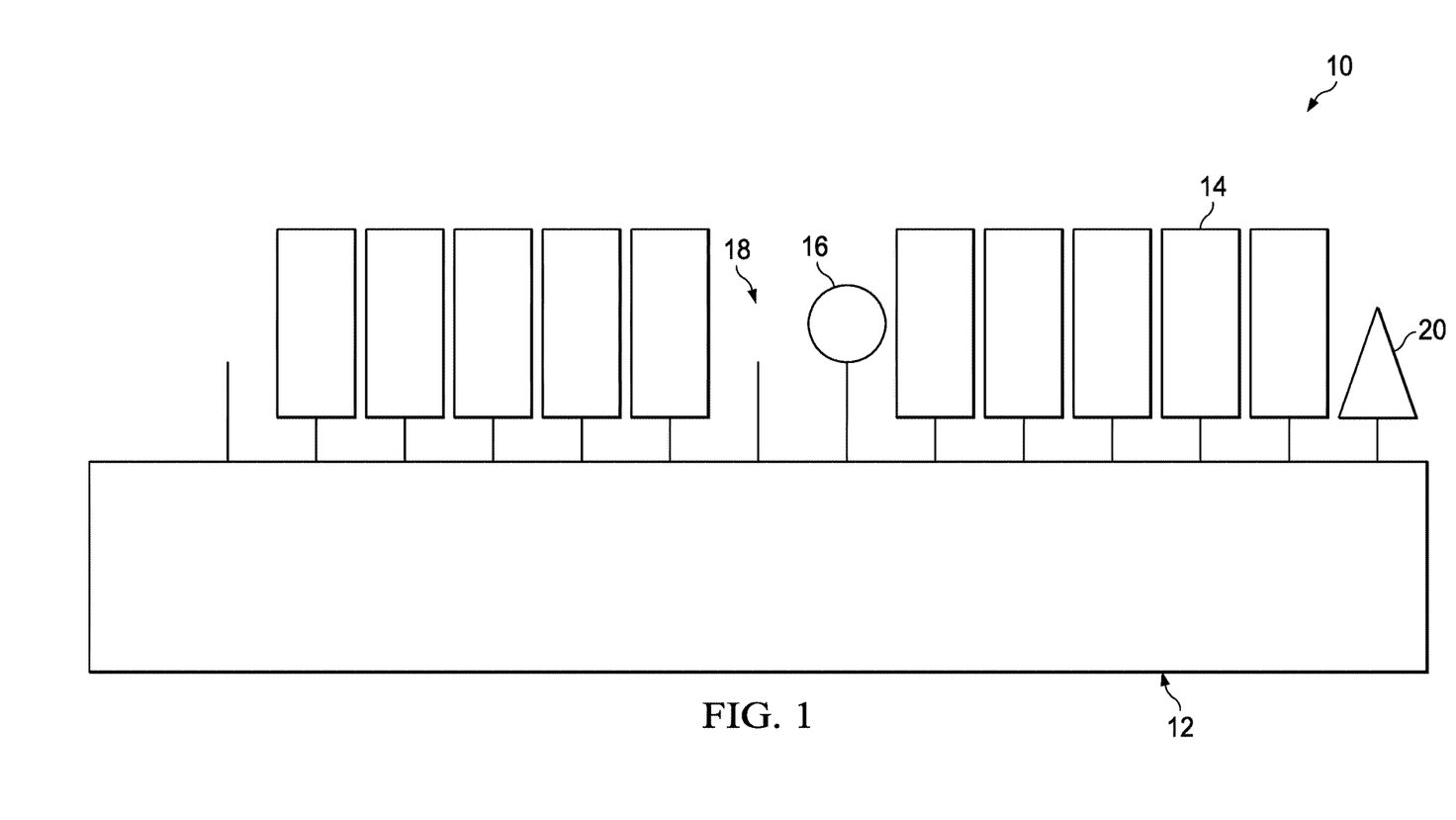
FIG. 1 is a schematic top view of an embodiment of a mobile hybrid micro-grid system, in accordance with embodiments of the present disclosure.

FIG. 1 is a schematic top view of an embodiment of a mobile-hybrid microgrid system 10. The microgrid system includes a mobile switchgear trailer 12. One or more generators 14 are connected to the switchgear trailer 12. In certain embodiments, each generator section includes a 1200 A Circuit breaker, wye/wye PTs, a main bus certified for up to 2000 Amps, a SEL 700 G relay, installation of a pilot wire detection relay, and 15 kV interconnect receptacle for cables. In the illustrated embodiment, a plurality of generators 14 are connected to the switchgear trailer 12. The generators are housed on trailers and can be easily moved and replaced. For example, if there was an issue with a generator, it could easily be taken offline, removed, and replaced with a second generator. As one of ordinary skill in the art will understand, the generators 14 may have an output of 13.8 kV and a capacity of 2.5 MW, such that an embodiment of the invention comprises connections for up to at least ten 2.5 MW natural gas engine generator trailers. The connections on the switchgear trailer 12 are interchangeable and a different power source could be connected to the switchgear trailer 12 in place of the generator 14. For example, an Energy Storage System (ESS) 20 can be connected to the switchgear trailer. In some embodiments a utility section 16 is connected to the switchgear trailer. Each utility section may include a 1200 A Circuit breaker, wye/wye PTs, a main bus certified for up to 2000 Amps, a SEL 700 G relay, installation of a pilot wire detection relay, and 15 kV interconnect receptacle for cables. It should be appreciated that the utility source 16 and ESS unit 20 could be connected to the switchgear trailer 12 at different connections than the ones illustrated in FIG. 1. Additional features show a feeder section 18 connected to the switchgear trailer 12. In certain embodiments, each feeder section includes a 1200 A Circuit breaker, a SEL 700 G relay, installation of a pilot wire detection relay, and 15 kV interconnect receptacle for cables.

Figure 2:
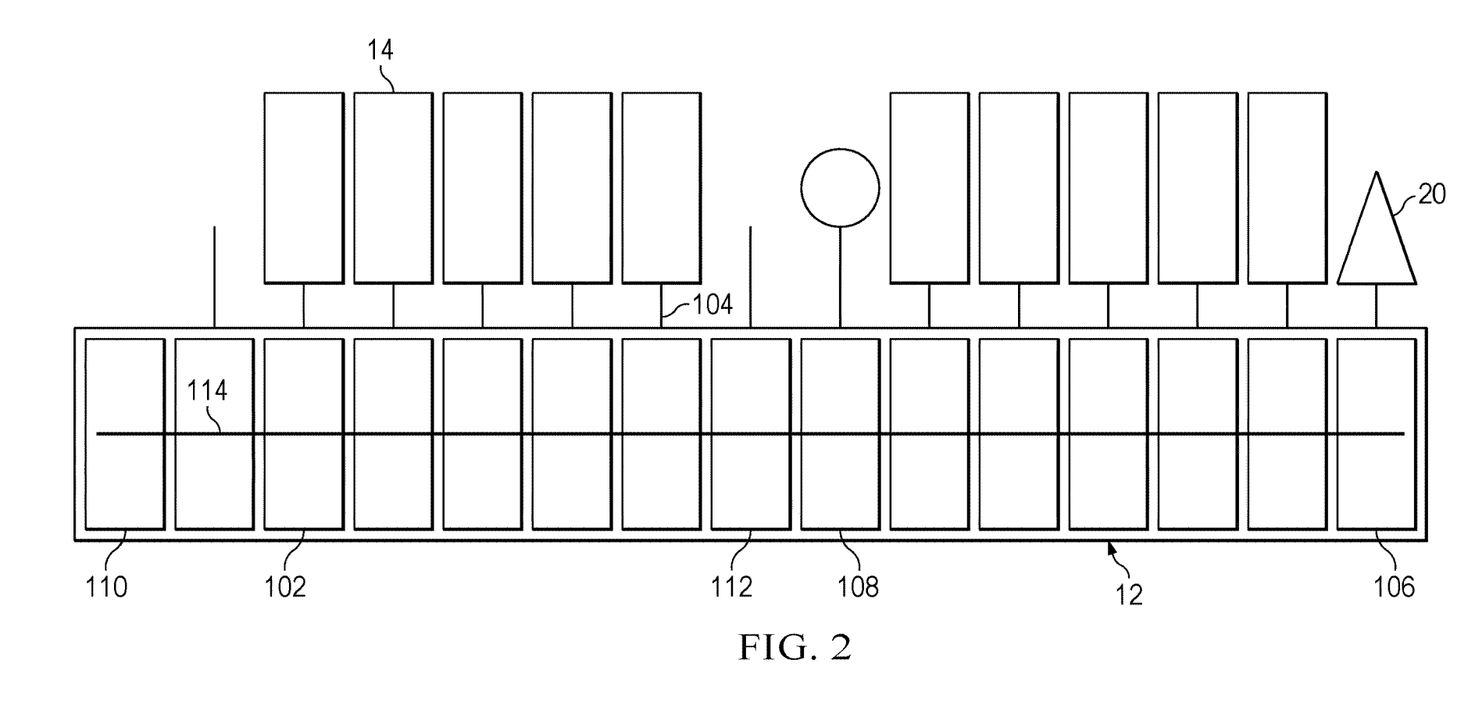
FIG. 2 is a cross-sectional view of an embodiment of a switchgear trailer, in accordance with embodiments of the present disclosure.

FIG. 2 is a schematic top view of an embodiment of a switchgear trailer 12 in accordance with one or more embodiments of the present disclosure. In this example, the switchgear trailer is broken up into 15 parallel compartments. A generator breaker 102 is positioned within the switchgear trailer. In this example, there are a plurality of generator breakers 102 positioned within the switchgear trailer. The connectors 104 between the breakers and the outside of the switchgear trailer 12 are uniform, such that the generator breakers 102 may be positioned at any connector within the switchgear trailer 12. An ESS unit breaker 106 may also be positioned within the switchgear trailer. It should be understood that an ESS unit breaker 106 may be replaced by another breaker, for example, a generator breaker 102. In some embodiments, a utility breaker 108 is positioned within the switchgear trailer. It should be understood that a utility breaker 108 may be replaced by another breaker, for example, a generator breaker 102. An auxiliary unit 110 is placed at one end of the switchgear trailer 12. It should be understood that the auxiliary unit 110 could instead be placed at the other end of the switchgear trailer 12. A feeder breaker 112 is positioned within the switchgear trailer 12. In some embodiments, a plurality of feeder breakers 112 may be positioned within the switchgear trailer 12. It should be understood that the breakers are interchangeable and may be positioned in any arrangement within the switchgear trailer. The breakers are all connected via a common bus switchgear 114. The common bus switchgear 114 is a high voltage bus with oversized ampacity for the microgrid.

In some embodiments the breakers of the switchgear trailer are enclosed in individual compartments. In other embodiments the breakers of the switchgear are enclosed in a single enclosure. The enclosures may include heating and cooling ventilation systems to control environmental factors such as dust, moisture, internal temperatures, and ambient temperatures. In some embodiments, weatherproof designs are used to ensure successful and reliable operations in the varying ambient conditions the equipment is exposed to.

In some embodiments, the switchgear trailer 12 is mounted on a single mobile platform that may be mobilized and demobilized regularly. In certain embodiments, the breakers of the switchgear are stackable. In these embodiments, the size of the switchgear trailer 12 can be reduced by up to 50%.

Figure 3:
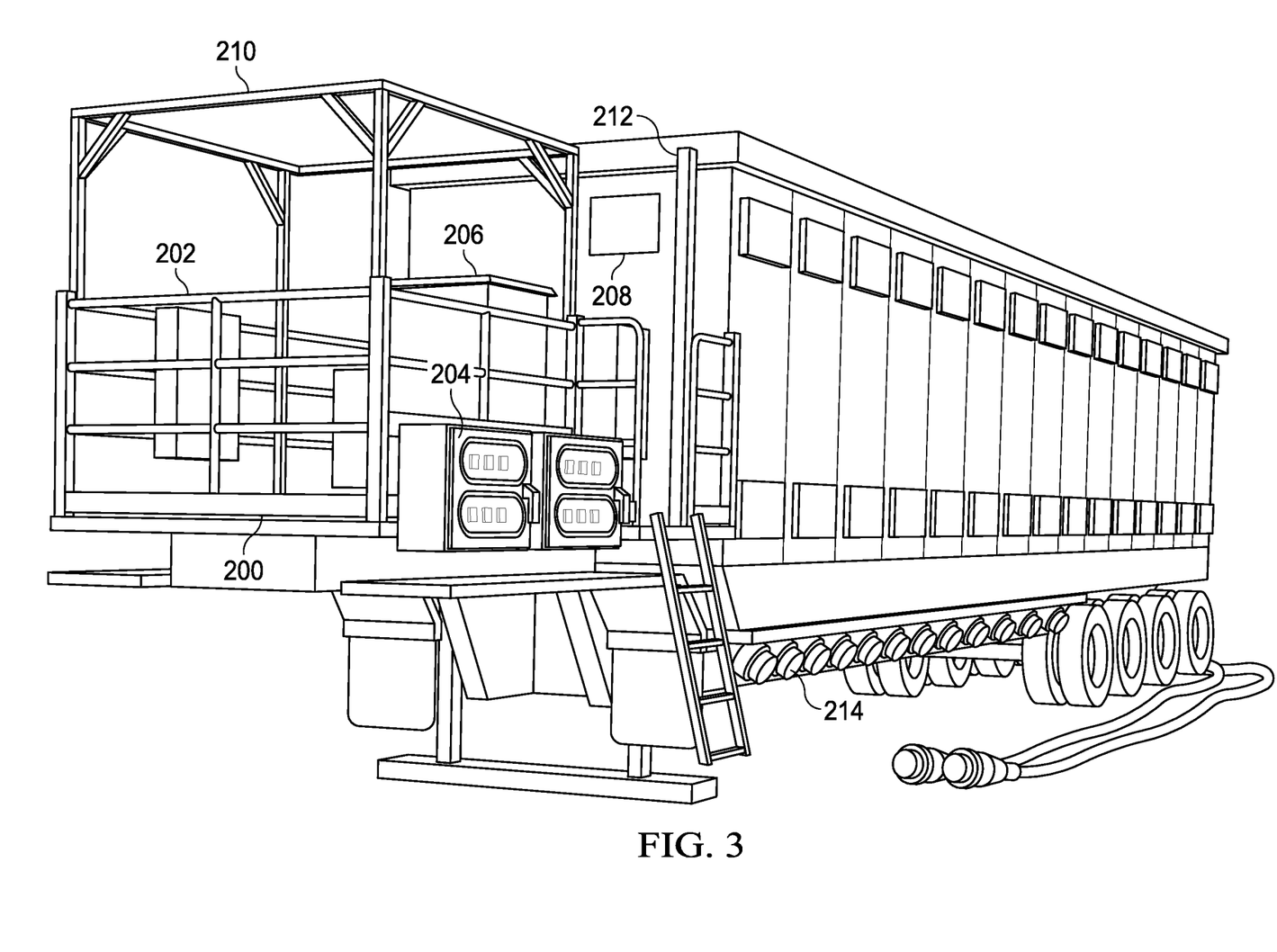
FIG. 3 is a schematic side view of an embodiment of a switchgear trailer, in accordance with embodiments of the present disclosure.

FIG. 3 is a schematic side view of an embodiment of a switchgear trailer 12 in accordance with one or more embodiments of the present disclosure. In this example, the switchgear trailer 12 includes a common platform 200. The common platform 200 is encompassed by a railing 202. On one side, the common platform includes relay racks 204. The relay racks 204 tie into an integrated control system. A server rack 206 is also mounted on the platform. The integrated control system is comprised of the server rack, communication cabling, interlock system, discussed below, and the control board. The common platform 200 is positioned on the exterior of one end of the switchgear trailer 12. The switchgear trailer 12 includes a manual control 208 that is accessible on the common platform 200. The common platform 200 also includes a satellite 210 and a cellular antenna 212. The satellite 210 and cellular antenna 212 allow for remote operations. The operator has the option to run the system wirelessly, from the platform with an ethernet cable, or manually through the manual control. The microgrid system is also configured such that if the operator cannot communicate with the system, the microgrid system will run on a default setting.

The integrated control system provides data including: electrical system parameters, breaker and component cycle life, preventive maintenance parameters, fuel data, emissions data real time from location, and geotagging. The integrated control system is designed for remote operation without supervision and is designed to provide wireless data with emissions aggregation and reporting. The integrated control system can report mass flow fuel consumption in real time or on a per generator basis. The switchgear system utilizes a novel mass flow meter technology. The integrated control system ensures redundancy and reliability of the microgrid system.

The switchgear trailer 12 also includes a plurality of connectors 214 on a side of the switchgear trailer 12. As discussed above, the plurality of connectors are uniform on the switchgear trailer, such that the connectors can be interchangeably used with various breaker systems.

Figure 4:
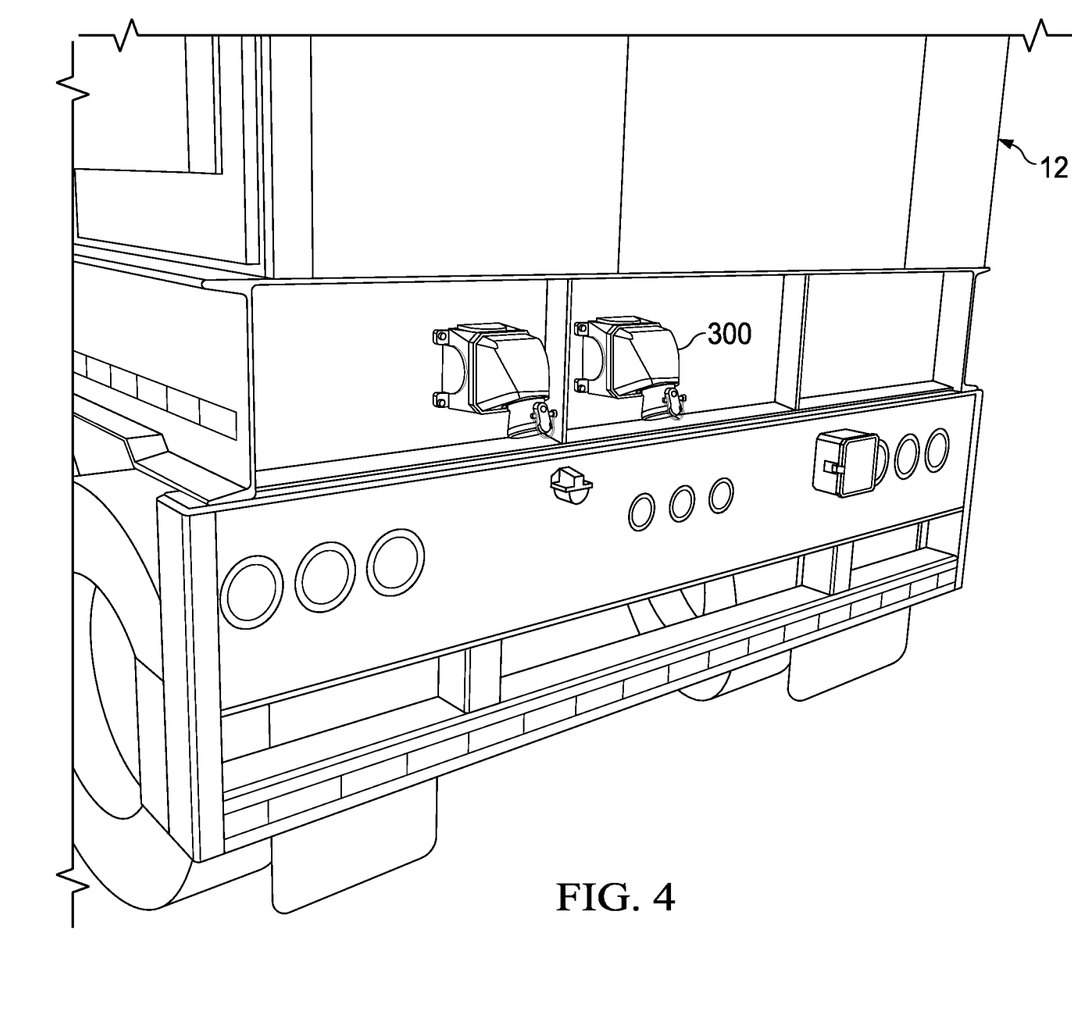
FIG. 4 is a schematic rear view of an embodiment of switchgear trailer, in accordance with embodiments of the present disclosure.

FIG. 4 is a schematic rear view of an embodiment of a switchgear trailer 12 in accordance with one or more embodiment of the present disclosure. In this example, the switchgear trailer 12 includes an output 300 from the auxiliary unit 110 of the switchgear trailer 12. Auxiliary section 110 powers the onboard functions and systems of the switchgear trailer and enables the microgrid to recycle energy. In some embodiments the auxiliary unit 110 is capable of at least 4 MVA of load.

Figure 5:
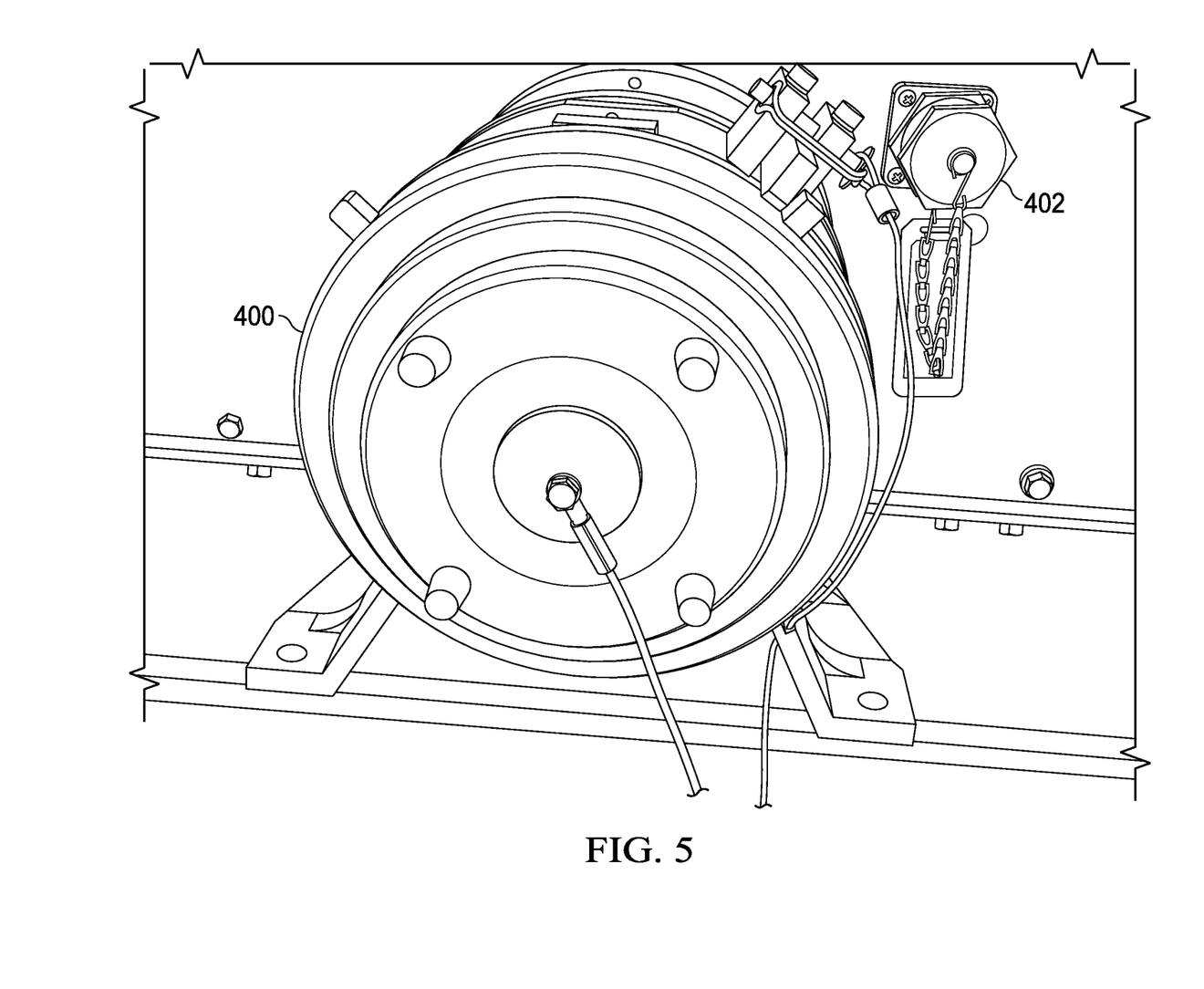
FIG. 5 is a schematic view of an embodiment of a connector on the switchgear trailer, in accordance with embodiments of the present disclosure.

FIG. 5 is a schematic view of an embodiment of a connector on the switchgear trailer, in accordance with embodiments of the present disclosure. In this example, the connector 400 is a TJB connector. Within the connector 400 are two pins. These pins are part of the interlock system 402. The interlock system is attached to the electrical cable connected to the switchgear trailer. The interlock system 402 connects to the integrated control system. The interlock system and integrated control system are configured such that if the interlock system loses connection between the electrical cable and the switchgear trailer it will shut off power to that connector. This ensures the system is operated safely. In some embodiments, the cables that plug into the connector 400 include a ground line. This ground line is constantly monitored by the integrated control system so if ground continuity is jeopardized the system can power off that connector.

Figure 6:
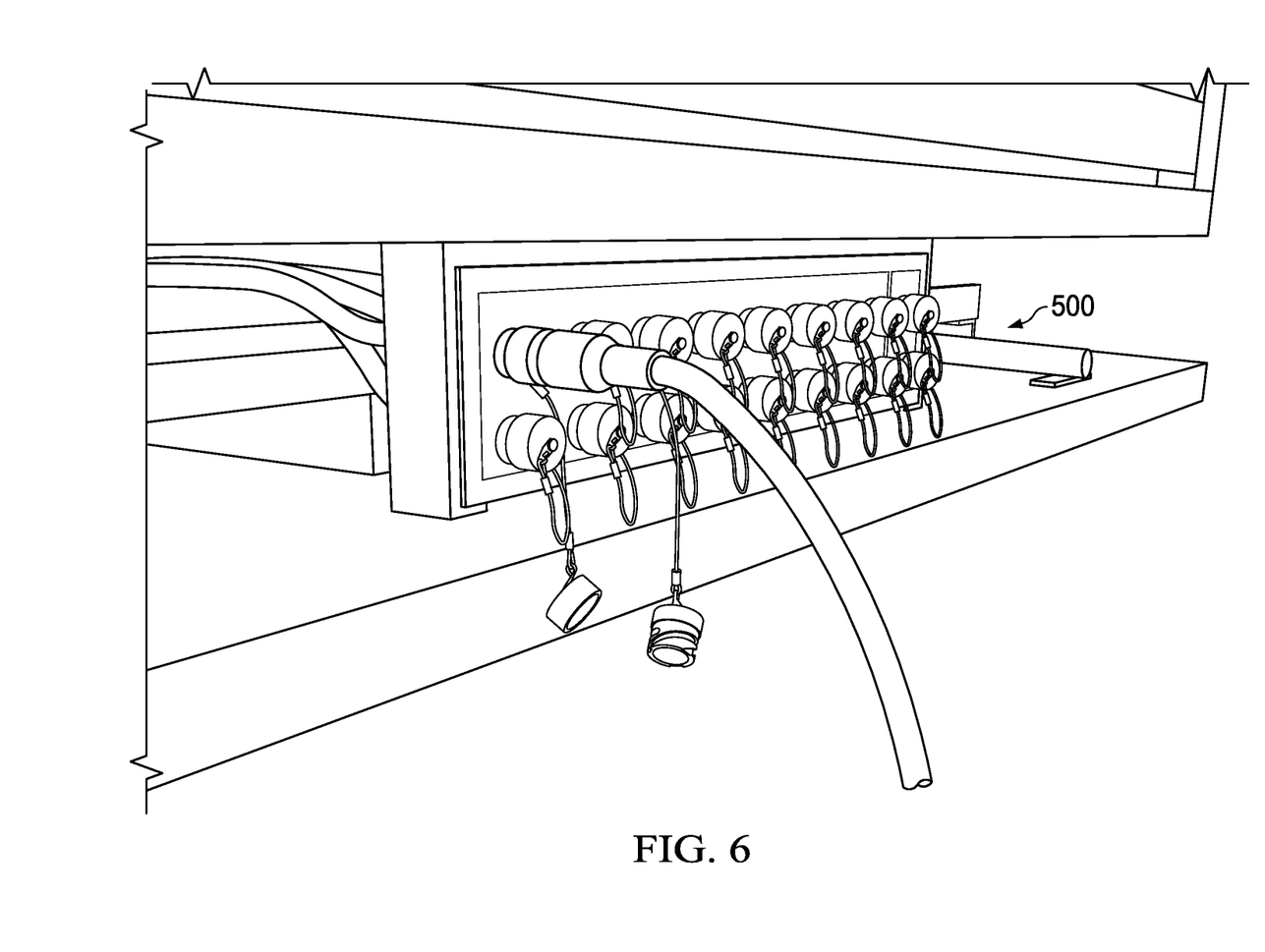
FIG. 6 is a schematic view of the integrated control system control board on the switchgear trailer, in accordance with embodiments of the present disclosure.

FIG. 6 is a schematic view of an embodiment of the integrated control system communication board 500. The integrated control system is comprised of the communication board, interlock system shown in FIG. 5, the communication cabling that runs between the interlock system and communication board, and the server rack.

The microgrid system also includes a variety of safety features. In some embodiments, the microgrid system includes a battery backup. This ensure reliability of the system. The battery backup allows the system to still operate the breakers through the common bus enabling control of the system.

The ESS can be connected to any of the input feeders of the system. The common bus allows for backfeed power to each of the energy sources. The backfeed power enables all the power generation sources to maintain readiness of operation while in a standby state. This readiness of operation allows the power sources to not be operated thereby reducing fuel consumption, operating cost, and overall emissions, when the instance occurs for immediate power required, the power sources can be tuned on immediately to dispatch power to the microgrid. The ESS provides back up power for the load, enables backfeed power to the other power sources attached to the microgrid, enhances the power system stiffness and power quality.

The microgrid can include neutral ground resistors on the power sources or a single neutral ground resistor. Further, the microgrid system can include a zig zag transformer in some embodiments. The zig zag transformer provides another way to connect and tie into the system and include high resistance neutral ground resistor. This limits the fault current, and the duration of said fault to minimize the risk of electrocution and damage to the equipment.

In some embodiments the generators are natural gas generators. It would be understood that natural gas generators could be fueled by natural gas, hydrogen, or other combustible gases. In some embodiments, the generators are not natural gas generators including diesel engine generators, turbine generators, solar panels, or wind turbines.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A switchgear trailer comprising:
a mobile platform;
at least ten input breakers in a parallel arrangement, the at least ten input breakers mounted on the mobile platform;
each of the at least ten input breakers having a load capacity of no more than 1200 amps and configured to be connected to a separate generator providing input power, such that each of the at least ten input breaker connects to one and only one of the separate generator, each separate generator configured to provide a maximum output power of 2.5 MW at 13.8 kV; and
a common bus mounted on the mobile platform and connected to each of the at least ten input breakers, the common bus is oversized relative to a total output power from a simultaneous operation provided by each of the separate generator operating at the maximum output power provided to a respective one of the at least ten input breakers.

2. The switchgear trailer of claim 1, further comprising an integrated control system mounted on the mobile platform, the integrated control system configured to control and/or monitor each of the separate generator.

3. The switchgear trailer of claim 1, wherein the at least ten input breakers are stackable.

4. The switchgear trailer of claim 2, further comprising an auxiliary unit mounted on the mobile platform, the auxiliary unit configured to power to onboard functions and systems of the switchgear trailer.

5. The switchgear trailer of claim 4, wherein the auxiliary unit is capable of at least 4 MVA of load.

6. The switchgear trailer of claim 4, wherein the onboard functions and systems includes the integrated control system.

7. The switchgear trailer of claim 2, further comprising an interlock system, wherein the integrated control system is configured to communicate with the interlock system.

\* \* \* \* \*